United States Patent
Burkhardt et al.

(10) Patent No.: US 7,919,561 B2
(45) Date of Patent: Apr. 5, 2011

(54) PROCESS OF PRODUCING THERMOPLASTIC POLYMER BLENDS

(75) Inventors: Terry J. Burkhardt, Bartlett, IL (US); Aspy K. Mehta, Humble, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 582 days.

(21) Appl. No.: 11/446,794

(22) Filed: Jun. 5, 2006

(65) Prior Publication Data

US 2007/0015877 A1    Jan. 18, 2007

Related U.S. Application Data

(60) Continuation-in-part of application No. 10/930,447, filed on Aug. 31, 2004, now Pat. No. 7,026,040, which is a division of application No. 10/303,448, filed on Nov. 25, 2002, now Pat. No. 6,806,316, which is a continuation of application No. 08/916,699, filed on Aug. 22, 1997, now abandoned.

(60) Provisional application No. 60/025,398, filed on Sep. 4, 1996, provisional application No. 60/699,663, filed on Jul. 15, 2005.

(51) Int. Cl.
*C08L 23/00* (2006.01)
*C08L 23/04* (2006.01)
*C08F 8/00* (2006.01)
*C08F 210/00* (2006.01)

(52) U.S. Cl. ........ 525/240; 525/191; 525/197; 526/351; 526/348

(58) Field of Classification Search .................. 525/240, 525/191, 197; 526/351, 348, 160
See application file for complete search history.

(56) References Cited

U.S. PATENT DOCUMENTS

| | | | | |
|---|---|---|---|---|
| 4,871,705 A * | 10/1989 | Hoel | | 502/117 |
| 4,956,427 A * | 9/1990 | Jenkins et al. | | 526/62 |
| 5,322,902 A | 6/1994 | Schreck et al. | | |
| 5,504,172 A * | 4/1996 | Imuta et al. | | 526/351 |
| 6,117,962 A | 9/2000 | Weng et al. | | |
| 6,147,180 A | 11/2000 | Markel et al. | | |
| 6,184,327 B1 | 2/2001 | Weng et al. | | |
| 6,248,832 B1 | 6/2001 | Peacock | | |
| 6,323,284 B1 | 11/2001 | Peacock | | |
| 6,413,900 B1 * | 7/2002 | Agapiou et al. | | 502/103 |
| 6,423,793 B1 | 7/2002 | Weng et al. | | |
| 6,472,474 B2 | 10/2002 | Burkhardt et al. | | |
| 6,500,563 B1 * | 12/2002 | Datta et al. | | 428/521 |
| 6,512,019 B1 * | 1/2003 | Agarwal et al. | | 521/134 |
| 6,642,316 B1 | 11/2003 | Datta et al. | | |
| 6,870,016 B1 * | 3/2005 | Burkhardt et al. | | 526/127 |
| 7,101,936 B2 | 9/2006 | Weng et al. | | |
| 7,223,822 B2 | 5/2007 | Abhari et al. | | |
| 7,294,681 B2 | 11/2007 | Jiang et al. | | |
| 7,524,910 B2 | 4/2009 | Jiang et al. | | |
| 7,541,402 B2 | 6/2009 | Abhari et al. | | |
| 7,550,528 B2 | 6/2009 | Abhari et al. | | |
| 2001/0021732 A1 * | 9/2001 | Terano et al. | | 523/351 |
| 2001/0039314 A1 | 11/2001 | Mehta et al. | | |
| 2003/0153689 A1 * | 8/2003 | Mehta et al. | | 525/240 |
| 2004/0110910 A1 * | 6/2004 | Arjunan | | 526/127 |
| 2004/0162403 A1 * | 8/2004 | Shimizu et al. | | 526/160 |
| 2004/0249046 A1 | 12/2004 | Abhari et al. | | |
| 2006/0052238 A1 * | 3/2006 | Lee et al. | | 502/117 |
| 2006/0240733 A1 * | 10/2006 | Bieser et al. | | 442/414 |
| 2006/0293453 A1 | 12/2006 | Jiang et al. | | |
| 2006/0293455 A1 | 12/2006 | Jiang et al. | | |
| 2006/0293460 A1 | 12/2006 | Jacob et al. | | |
| 2006/0293461 A1 | 12/2006 | Jiang et al. | | |
| 2006/0293462 A1 | 12/2006 | Jacob et al. | | |

FOREIGN PATENT DOCUMENTS

WO    WO 99/45046    10/1999
WO    WO 00/01766    1/2000

OTHER PUBLICATIONS

U.S. Appl. No. 12/335,252, filed Dec. 15, 2008, Jiang et al.
Markel et al., *Metallocene-Based Branch—Block Thermoplastic Elastomers*, Macromolecules, 2000, vol. 33, No. 23, pp. 8541-8548.

* cited by examiner

*Primary Examiner* — Vasu Jagannathan
*Assistant Examiner* — Irina Krylova

(57) ABSTRACT

A process is described for producing a polymer blend comprising (a) a first polymer component comprising a crystalline propylene polymer and (b) a second polymer component comprising a copolymer of propylene with at least one comonomer, wherein the copolymer comprises between about 7 wt % and about 28 wt % of comonomer and the copolymer has a heat of fusion of 0.5 to 70 J/g and an mm triad tacticity of 75% or greater. The process comprises polymerizing propylene under first polymerization conditions in a polymerization reaction zone to produce a first effluent comprising a crystalline propylene polymer containing no more than 10% by weight of other monomers, the first polymerization conditions comprising a first reaction temperature between about 50° C. and about 100° C. Propylene is then copolymerized with at least one comonomer under second polymerization conditions in the presence of a metallocene catalyst and at least part of said first effluent in a slurry polymerization reaction zone to produce the second polymer component as a blend with the first polymer component, the second polymerization conditions comprising a second reaction temperature at least 7° C. less than the first reaction temperature.

21 Claims, No Drawings

PROCESS OF PRODUCING THERMOPLASTIC POLYMER BLENDS

PRIORITY CLAIM AND CROSS-REFERENCE TO RELATED APPLICATIONS

This application claims benefit of U.S. Provisional Application Ser. No. 60/699,663 filed Jul. 15, 2005. This application relates to 60/649,074 filed Jan. 31, 2005, U.S. Provisional Application Ser. No. 60/648,968 filed Jan. 31, 2005 and U.S. Provisional Application Ser. No. 60/645,138 filed Jan. 20, 2005. This application is also a continuation in part of U.S. Ser. No. 10/930,447, filed Aug. 31, 2004, now U.S. Pat. No. 7,026,040, which is a divisional of U.S. Ser. No. 10/303,448, filed Nov. 25, 2002, now U.S. Pat. No. 6,806,316, which is a continuation of U.S. Ser. No. 08/916,699, filed Aug. 22, 1997, now abandoned, which claims priority to and the benefit of U.S. Ser. No. 60/025,398, filed Sep. 4, 1996.

FIELD

This invention relates to a process for producing thermoplastic polymer blends and, in particular, blends of an isotactic propylene homopolymer component and a propylene copolymer component.

BACKGROUND

Blends of isotactic polypropylene with elastomeric ethylene propylene copolymers are well known and are commercially significant in view of their useful properties in the production of, for example, molded parts, films, fibers and fabrics. Of particular interest are polymer blends in which the ethylene propylene copolymer is produced using metallocene catalysts since these copolymers can exhibit improved properties, such as elasticity, flexural modulus and tensile strength. For example, U.S. Pat. No. 6,642,316 discloses a polymer blend comprising from about 35% to about 85% of isotactic polypropylene and 30% to about 70% of a copolymer of propylene with about 5% to about 35% by weight of an alpha-olefin, especially ethylene, produced using a chiral metallocene catalyst. The individual components of the blend are produced separately and are then blended by any procedure that guarantees an intimate mixture of the components, for example melt pressing, melt mixing and extrusion blending.

Various processes have been proposed for producing polymer blends by multistage polymerization wherein the individual components of the blend are formed in sequential polymerization steps in the same or different reactors. In this way, the need for a separate blending step can be obviated or minimized. However, none of the existing proposals have proved entirely satisfactory and hence there is a need to provide an improved multistage polymerization process for producing polymer blends.

Today, isotactic polypropylene is widely produced commercially by a slurry polymerization process, whereas ethylene propylene copolymer elastomers are produced via solution polymerization. However, some solution polymerization processes have disadvantages in that monomer conversion is limited and the solvent must be recycled and purified. In addition, there is a limit to the molecular weight of the copolymers that can be produced, due to the resulting increase in solution viscosity. Ethylene propylene copolymer elastomers have been difficult to produce using slurry-based polymerization systems since, even at low reactor temperatures, these tend to result in reactor fouling and the formation of rubbery clumps that attach themselves to the reactor agitator, thereby necessitating reactor shut-down. Accordingly, a widely used polymerization scheme for producing reactor blends of propylene and ethylene propylene copolymer elastomers is to make the polypropylene in a slurry polymerization reactor and the copolymer elastomer in a gas phase reactor. This approach is the current basis for the production of a substantial amount of commercial polypropylene impact copolymer.

U.S. Pat. No. 6,472,474 discloses a propylene impact copolymer composition comprising from 40% to 95% by weight of Component A and from 5% to 60% by weight of Component B based on the total weight of the impact copolymer, Component A comprising a propylene homopolymer or copolymer, wherein the copolymer comprises 10% or less by weight ethylene, butene, hexene or octene comonomer, and the amount of amorphous polypropylene in Component A is less than 2 wt %; Component B comprising a propylene copolymer, wherein the copolymer comprises from 20% to 70% by weight ethylene, butene, hexene and/or octene comonomer; wherein Component B is formed in the presence of Component A in a multiple stage polymerization process. According to column 5, line 59 to column 6, line 4 of the '474 patent, each stage of the polymerization process may be independently carried out in either the gas or liquid slurry phase, although preferably Component A is polymerized in a first liquid slurry or solution polymerization reactor and Component B is polymerized in a second, gas phase reactor.

U.S. Patent Application Publication No. 2001/0039314, published Nov. 8, 2001, discloses a film comprising crystalline isotactic propylene polymer comprising: a) from 10 to 90 wt % crystalline propylene homopolymer; and b) from 90 to 10 wt % of a crystalline propylene copolymer, the copolymer comprising units derived from propylene and units derived from at least one other comonomer, preferably ethylene, wherein the wt % of the comonomer based on the total weight of the polymer is in the range of from 0.05 to 15. The polymer is prepared using a metallocene catalyst system comprising at least two metallocenes in a polymerization process that involves the sequential or parallel polymerization of the propylene homopolymer and copolymer. In one embodiment, the polymerization is conducted in slurry reactors connected in series with the propylene homopolymer being produced in the first reactor and the propylene cocopolymer being produced in the presence of the initially produced homopolymer.

SUMMARY

The present invention relates to a process for producing a polymer blend comprising (a) a first polymer component comprising a crystalline propylene polymer and (b) a second polymer component comprising a copolymer of propylene with at least one comonomer, wherein the copolymer comprises between about 7 wt % and about 28 wt % of said at least one comonomer and the copolymer has an mm triad tacticity of 75% or greater and a heat of fusion of 0.5 J/g to 70 J/g, (preferably also having a melting point of less than 85° C., preferably less than 78° C.) the process comprising:

(i) polymerizing propylene under first polymerization conditions in a polymerization reaction zone to produce a first effluent comprising a crystalline propylene polymer containing no more than 10% by weight of other monomers, the first polymerization conditions comprising a first reaction temperature between about 50° C. and about 100° C.; and (ii) subsequently copolymerizing propylene with said at least one comonomer under second polymerization conditions in the presence of a metallocene catalyst and at least part of said first effluent in a slurry polymerization reaction zone to produce said second polymer component, the second polymerization conditions comprising a second reaction temperature at least 7° C. less than said first reaction temperature.

Conveniently, the second polymerization conditions comprising a second reaction temperature 4° C. or 6° C. less than said first reaction temperature.

Conveniently, the polymerizing (i) is conducted in the presence of a metallocene catalyst.

Conveniently, the polymerizing (i) is conducted by a slurry process.

Conveniently, said first effluent comprises a crystalline propylene polymer containing no more than 5%, preferably no more than 3%, by weight of other monomers.

Conveniently, the polymerizing (i) is conducted in the substantial absence of monomers other than propylene, preferably less 0.5 wt % monomers, preferably less than 0.1 weight %, based upon the weight of the monomers present.

Conveniently, said at least one comonomer in (ii) is ethylene or a $C_4$ to $C_{12}$ α-olefin. More preferably, said at least one comonomer is selected from ethylene, 1-butene, 1-pentene, 1-hexene, and 1-octene, and most preferably is ethylene.

Conveniently, said second polymerization conditions comprise a second temperature between about 7° C. and about 50° C., such as between about 10° C. and about 40° C., less than said first temperature.

Conveniently, the copolymerizing (ii) is conducted in the same polymerization reaction zone as the polymerizing (i).

DETAILED DESCRIPTION

The present invention provides a process for producing a thermoplastic polymer blend comprising a first polymer component (FPC) comprising a crystalline propylene polymer and a second polymer component (SPC) comprising a copolymer of propylene with at least one comonomer, wherein the copolymer comprises between about 7 and about 28 wt % of said comonomer and contains propylene crystallinity. According to the invention, it has now been found that such a blend can be produced directly by a serial polymerization process substantially without reactor fouling, even though the SPC is produced by slurry polymerization.

In particular, the process of the invention involves initially polymerizing propylene either alone or in the presence of other monomers at a temperature between about 50° C. and about 100° C. such that no more than 10 wt % of other monomers are incorporated in the FPC. Polymerization of the FPC is preferably, but not necessarily, conducted in the presence of a metallocene catalyst and preferably, but not necessarily, conducted by a slurry process. After polymerization of the FPC is complete, propylene is copolymerized with the at least one comonomer of the SPC in the presence of a metallocene catalyst and at least part of the effluent from the first polymerization step at a temperature at least 7° C. less, conveniently 4° C. or 6° C. less, than said first temperature. The copolymerization step is conducted by a slurry process. The product of the copolymerization step is a reactor blend of the FPC and SPC as a free-flowing granular composition.

The First Polymer Component (FPC)

In accordance with the present invention, the first polymer component (FPC) comprises a crystalline propylene polymer, which can be a propylene homopolymer, or a copolymer of propylene, or a mixture of propylene homopolymers and copolymers.

The FPC is predominately crystalline, i.e., it has a melting point (Tm; second melting as measured by differential scanning calorimetry) of at least 100° C., generally at least 110° C., such as at least 130° C., for example at least 140° C. and preferably less than or equal to 170° C. The term "crystalline," as used herein, characterizes those polymers which possess high degrees of inter- and intra-molecular order. Generally, the FPC has a heat of fusion of at least 75 J/g, alternatively at least 80 J/g, as determined by DSC analysis. The heat of fusion is dependent on the crystallinity, which is influenced by the composition of the polypropylene. Generally, a polypropylene homopolymer will have a higher heat of fusion than a copolymer or blend of homopolymer and copolymer.

The FPC can vary widely in composition. For example, substantially isotactic polypropylene homopolymer or propylene copolymer containing no more than 10 weight % of other monomers, i.e., at least 90% by weight propylene, such as no more than 5 weight %, preferably no more than 3 weight %, of other monomers can be used. Further, the polypropylene can be present in the form of a graft or block copolymer, in which the blocks of polypropylene have substantially the same stereoregularity as the propylene-alpha-olefin copolymer so long as the graft or block copolymer has a sharp melting point above 110° C., alternatively above 130° C. and preferably above 140° C., characteristic of the stereoregular propylene sequences. Preferably, the FPC contains isotactic propylene crystallinity. The FPC may be a combination of homopolypropylene, and/or random, and/or block copolymers as described herein. When the above FPC is a random copolymer, the amount of the copolymerized alpha-olefin in the copolymer is, in general, no more than 10% by weight, alternatively 0.5% to 8% by weight, alternatively 2% to 6% by weight. The preferred alpha-olefins contain 2 or from 4 to 12 carbon atoms. One, or two or more alpha-olefins can be copolymerized with propylene Exemplary alpha-olefins may be selected from the group consisting of ethylene; butene-1; pentene-1,2-methylpentene-1,3-methylbutene-1; hexene-1,3-methylpentene-1,4-methylpentene-1,3,3-dimethylbutene-1; heptene-1; hexene-1; methylhexene-1; dimethylpentene-1 trimethylbutene-1; ethylpentene-1; octene-1; methylpentene-1; dimethylhexene-1; trimethylpentene-1; ethylhexene-1; methylethylpentene-1; diethylbutene-1; propylpentane-1; decene-1; methylnonene-1; nonene-1; dimethyloctene-1; trimethylheptene-1; ethyloctene-1; methylethylbutene-1; diethylhexene-1; dodecene-1 and hexadodecene-1.

The weight average molecular weight (Mw) of the FPC can be between 10,000 to 5,000,000, alternatively 50,000 to 500,000, with a molecular weight distribution (Mw/Mn) between 1.5 to 10.0. As used herein, molecular weight (Mw) and molecular weight distribution (MWD or Mw/Mn) are determined by gel permeation chromatography using polystyrene standards. The GPC data are taken on a Waters 150 GPC using three Shodex mixed bed AT-80M/S columns. The solvent used is 1,2,4 trichlorobenzene that contains 300 ppm of the antioxidant Santonox R. The run conditions are an operating temperature of 145° C., a nominal flow rate of 1.0 ml/min and a 300 μL injection volume. Solutions for injection are 1.0 to 1.5 mg/ml. The columns are calibrated by running a series of narrow molecular weight polystyrene (PS) standards and recording their retention volumes. Polypropylene (PP) molecular weight values are calculated using the "universal calibration" approach and the following Mark-Houwink coefficients:

|    | k (dL/g)              | a    |
|----|-----------------------|------|
| PS | $1.75 \times 10^{-4}$ | 0.67 |
| PP | $8.33 \times 10^{-5}$ | 0.80 |

A third order fit is used to fit the Log (Mw) vs Retention volume points. The data are taken and analyzed by Waters Millenium software.

The Second Polymer Component (SPC)

The second polymer component ("SPC") is an elastomeric copolymer with a low to moderate level of crystallinity due to stereoregular propylene sequences. The SPC comprises a propylene copolymer, particularly a random propylene copolymer in which the propylene stereoregularity is disrupted at least in part by comonomers, but a level of propylene crystallinity is maintained, as measured by the heat of fusion of the copolymer. Conveniently, the SPC comprises from about 5% to about 28% by weight of one or more comonomers, alternately from about 7% to about 25% by weight, alternately from about 10% to about 20% by weight, with the balance being made up by propylene. Alternately, the SPC comprises from about 5% to about 16% by weight of one or more comonomers (preferably ethylene), alternately from about 6% to about 16% by weight, alternately from about 7% to about 15% by weight, with the balance being made up by propylene.

in one embodiment, the SPC further comprises a nonconjugated diene monomer to aid in vulcanization and other chemical modification of the blend composition. The amount of diene present in the polymer is preferably less than 10% by weight, and more preferably less than 5% by weight, preferably between 0.1 to 2.5 weight % diene. The diene may be any non-conjugated diene which is commonly used for the vulcanization of ethylene propylene rubbers including, but not limited to, ethylidene norbornene, vinyl norbornene, and dicyclopentadiene, methyloctadiene, and C4 to C20 alpha-omega dienes.

In one embodiment, the SPC is a copolymer of propylene and at least one comonomer selected from ethylene, $C_4$-$C_{12}$ α-olefins, and combinations thereof. Typically, the at least one comonomer is selected from ethylene, 1-butene, 1-pentene, 1-hexene, and 1-octene, with ethylene being preferred. In one aspect of this embodiment, the copolymer includes comonomer (preferably ethylene-derived) units in an amount ranging from a lower limit of 7%, 8%, or 10% by weight to an upper limit of 20%, 25%, or 28% by weight. This embodiment also includes propylene-derived units present in the copolymer in an amount ranging from a lower limit of 72%, 75%, or 80% by weight to an upper limit of 93%, 92%, or 90% by weight. Preferably, the copolymer comprises from about 8% to about 20% by weight of ethylene-derived units, with the remainder being propylene-derived units. These percentages by weight are based on the total weight of the propylene and comonomer (such as ethylene-derived units); i.e., based on the sum of weight percent propylene-derived units and weight percent ethylene-derived units being 100%.

The ethylene composition of a polymer can be measured as follows. A thin homogeneous film is pressed at a temperature of about 150° C. or greater, then mounted on a Perkin Elmer PE 1760 infrared spectrophotometer. A full spectrum of the sample from 600 $cm^{-1}$ to 4000 $cm^{-1}$ is recorded and the monomer weight percent of ethylene can be calculated according to the following equation: Ethylene wt %=82.585−111.987X+30.045 $X^2$, wherein X is the ratio of the peak height at 1155 $cm^{-1}$ and peak height at either 722 $cm^{-1}$ or 732 $cm^{-1}$, whichever is higher. The concentrations of other monomers in the polymer can also be measured using infra-red methods.

Comonomer content of discrete molecular weight ranges can be measured by Fourier Transform Infrared Spectroscopy (FTIR) in conjunction with samples collected by GPC. One such method is described in Wheeler and Willis, Applied Spectroscopy, 1993, vol. 47, pp. 1128-1130. Different but similar methods are equally functional for this purpose and well known to those skilled in the art.

Comonomer content and sequence distribution of the polymers can be measured by $^{13}C$ nuclear magnetic resonance ($^{13}C$ NMR), and such method is well known to those skilled in the art. For example polymer microstructure is determined by $^{13}C$-NMR spectroscopy, including the concentration of isotactic and syndiotactic diads ([m] and [r]), triads ([mm] and [rr]), and pentads ([mmmm] and [rrrr]). Samples are dissolved in $d_2$-1,1,2,2-tetrachloroethane. Spectra are recorded at 125° C. using a NMR spectrometer of 75 or 100 MHz. Polymer resonance peaks are referenced to mmmm=21.8 ppm. Calculations involved in the characterization of polymers by NMR follow the work of F. A. Bovey in "Polymer Conformation and Configuration" Academic Press, New York 1969 and J. Randall in "Polymer Sequence Determination, $^{13}C$-NMR Method", Academic Press, New York, 1977. The percent of methylene sequences of two in length, %$(CH_2)_2$, are calculated as follows: the integral of the methyl carbons between 14-18 ppm (which are equivalent in concentration to the number of methylenes in sequences of two in length) divided by the sum of the integral of the methylene sequences of one in length between 45-49 ppm and the integral of the methyl carbons between 14-18 ppm, times 100. This is a minimum calculation for the amount of methylene groups contained in a sequence of two or more since methylene sequences of greater than two have been excluded. Assignments are based on H. N. Cheng and J. A. Ewen, Makromol. Chem. 1989, 190, 1931.

In one embodiment, the SPC comprises a random propylene copolymer having a narrow compositional distribution. In another embodiment, the polymer is a random propylene copolymer having a narrow compositional distribution and a melting point as determined by DSC of from 25° C. to 110° C. The copolymer is described as random because for a polymer comprising propylene, comonomer, and optionally diene, the number and distribution of comonomer residues is consistent with the random statistical polymerization of the monomers. In stereoblock structures, the number of block monomer residues of any one kind adjacent to one another is greater than predicted from a statistical distribution in random copolymers with a similar composition. Historical ethylene-propylene copolymers with a stereoblock structure have a distribution of ethylene residues consistent with these blocky structures rather than a random statistical distribution of the monomer residues in the polymer. The intramolecular composition distribution (i.e., blockiness) of the copolymer may be determined by $^{13}C$ NMR, which locates the comonomer residues in relation to the neighboring propylene residues. The intermolecular composition distribution of the copolymer is determined by thermal fractionation in a solvent. A typical solvent is a saturated hydrocarbon such as hexane or heptane. The thermal fractionation procedure is described below. Typically, approximately 75% by weight, preferably 85% by weight, of the copolymer is isolated as one or two adjacent, soluble fractions with the balance of the copolymer in immediately preceding or succeeding fractions. Each of these fractions has a composition (wt % comonomer such as ethylene or other α-olefin) with a difference of no greater than 20% (relative), preferably 10% (relative), of the average weight % comonomer of the copolymer. The copolymer has a narrow compositional distribution if it meets the fractionation test described above. To produce a copolymer having the desired randomness and narrow composition, it is beneficial if (1) a single sited metallocene catalyst is used which allows only a single statistical mode of addition of the first and second monomer sequences and (2) the copolymer is well-mixed in a continuous flow stirred tank polymerization reactor which allows only a single polymerization environment for substantially all of the polymer chains of the copolymer.

The crystallinity of polymers may be expressed in terms of heat of fusion. Peak melting temperature or melting point (Tm), peak crystallization temperature (Tc), heat of fusion (Hf or ΔHf) and percent crystallinity are determined via DSC measurements (ASTM E 794-85) described below. Data are obtained using a TA Instruments model 2910 machine or a Perkin-Elmer DSC 7 machine. In the event that the TA Instruments 2910 machine and the Perkin-Elmer DSC7 machine produce different DSC data, the data from the TA Instruments model 2910 are used. Samples weighing approximately 5-10 mg are sealed in aluminum sample pans. The DSC data is recorded by first cooling the sample to about −50° C. and then gradually heating it to 200° C. at a rate of 10° C./min. The sample is kept at 200° C. for 5 min before a second cooling/heating cycle is applied. Both the first and second cycle thermal events are recorded. Areas under the melting curves are measured and used to determine the heat of fusion and the degree of crystallinity. The percent crystallinity (X %) is calculated using the formula X %=[area under the curve (J/g)/B(J/g)]*100, where B is the heat of fusion for 100% crystalline homopolymer of the major monomer component. The values for B are obtained from the Polymer Handbook, Fourth Edition, published by John Wiley and Sons, New York, 1999. A value of 189 J/g is used as the heat of fusion for 100% crystalline polypropylene. For the semi-crystalline polymers having appreciable crystallinity (first polymer component), the melting temperature is measured and reported during the second heating cycle (or second melt). For the semi-amorphous or elastomeric copolymer having comparatively low crystallinity (second polymer component), the melting temperature is measured and reported during the first heating cycle. Prior to the DSC measurement, the sample is aged (typically by holding it at ambient temperature for a period of at least 48 hr, desirably up to about 5 days) or annealed, to maximize the level of crystallinity.

Embodiments of the present invention include SPC polymers having a heat of fusion, as determined by DSC, ranging from a lower limit of about 3 J/g, to an upper limit of about 75 J/g. Alternately the SPC polymer may have an Hf which is greater than or equal to about 0.5 Joules per gram (J/g), and is less than or equal to about 70 J/g, preferably less than or equal to about 50 J/g, preferably less than or equal to about 35 J/g, preferably less than or equal to about 25 J/g. Preferably the SPC polymers also have a heat of fusion that is greater than or equal to about 1 J/g, preferably greater than or equal to about 2.5 J/g, preferably greater than or equal to about 5 J/g.

The crystallinity of the polymer may also be expressed in terms of crystallinity percent. The thermal energy or heat of fusion for the highest order of polypropylene is estimated at 189 J/g. That is, 100% crystallinity is equal to 189 J/g. Therefore, according to the aforementioned heats of fusion, the SPC polymer has a percent crystallinity within the range having an upper limit of 40%, 30%, 25%, or 20%, and a lower limit of 1%, 3%, 5%, 7%, or 8%.

The level of crystallinity is also reflected in the melting point. The term "melting point," as used herein, for the second polymer component, is the highest temperature peak among principal and secondary melting peaks as determined by DSC, discussed above. In one embodiment of the present invention, the polymer has a single melting point. Typically, a sample of propylene copolymer will show secondary melting peaks adjacent to the principal peak, which are considered together as a single melting point. The highest of these peaks is considered the melting point. The SPC preferably has a melting point by DSC ranging from an upper limit of 110° C., 105° C., 90° C., 80° C., or 70° C., to a lower limit of 0° C., 20° C., 25° C., 30° C., 35° C., 40° C., or 45° C.

In a preferred embodiment the SPC has a melting point of 78° C. or less, preferably 75° C. or less. Alternately, the SPC has a melting point of 78° C. or less, preferably 75° C. or less and a comonomer content (preferably ethylene) of 15 mole % or less. Alternately, the SPC has a melting point of 85° C. or less, preferably 80° C. or less and a comonomer content (preferably ethylene) of more than 15 mole %.

In a preferred embodiment, the SPC may have a g' index value of 0.99 or greater when measured at the Mw of the polymer using the intrinsic viscosity of isotactic polypropylene as the baseline. For use herein, the g' index is defined as:

$$g' = \frac{\eta_b}{\eta_l}$$

where $\eta_b$ is the intrinsic viscosity of the random propylene polymer and $\eta_l$ is the intrinsic viscosity of a linear polymer of the same viscosity-averaged molecular weight ($M_v$) as the random propylene polymer. $\eta_l = KM_v^\alpha$, K and α are measured values for linear polymers and should be obtained on the same instrument as the one used for the g' index measurement, preferably k=0.0002288 and α=0.705 for propylene polymers.

In a preferred embodiment, the SPC may have a crystallization temperature (Tc) measured with differential scanning calorimetry (DSC) of about 200° C. or less, more preferably, 150° C. or less.

In a preferred embodiment, the SPC may have a density of about 0.85 to about 0.92 g/cc, more preferably, about 0.87 to 0.90 g/cc, more preferably about 0.88 to about 0.89 g/cc at room temperature as measured per the ASTM D-1505 test method.

The SPC may have a weight average molecular weight (Mw) within the range having an upper limit of 5,000,000 g/mol, 1,000,000 g/mol, or 500,000 g/mol, and a lower limit of 10,000 g/mol, 20,000 g/mol, or 80,000 g/mol, and a molecular weight distribution Mw/Mn (MWD), sometimes referred to as a "polydispersity index" (PDI), ranging from a lower limit of 1.5, 1.8, or 2.0 to an upper limit of 10, 8, 6, 5, or 4.5, preferably between 1.5 and 5.

Preferred SPCs, useful in this invention, have a melt flow rate (ASTM D-1238; 2.16 kg, 230° C.) of 0.1 to 2000 dg/min. The choice of melt flow rate (MFR) depends on the end-application of the final blend. For example, typical MFRs range from 0.1 to 20 dg/min for films; 1 to 100 dg/min for molded articles; 15 to 60 dg/min for spunbond nonwovens and 200 to 2000 dg/min for melt blown nonwovens.

The SPC used in embodiments of the present invention can have a tacticity index (m/r) ranging from a lower limit of 4 or 6 to an upper limit of 8, 10, or 12. The tacticity index, expressed herein as "m/r", is determined by $^{13}$C nuclear magnetic resonance (NMR). The tacticity index m/r is calculated as defined in H. N. Cheng, Macromolecules, 17, 1950 (1984). The designation "m" or "r" describes the stereochemistry of pairs of contiguous propylene groups, "m" referring to meso and "r" to racemic. An m/r ratio of 0 to less than 1.0 generally describes a syndiotactic polymer, an m/r ratio of 1.0 an atactic polymer and an m/r ratio of greater than 1.0 an isotactic polymer. An isotactic material theoretically may have an m/r ratio approaching infinity.

In one embodiment, the SPC has isotactic stereoregular propylene crystallinity. The term "stereoregular" as used herein means that the predominant number, i.e. greater than 80%, of the propylene residues in the polypropylene or in the polypropylene continuous phase of a blend, such as impact copolymer exclusive of any other monomer such as ethylene, has the same 1,2 insertion and the stereochemical orientation of the pendant methyl groups is the same, either meso or racemic.

An ancillary procedure for the description of the tacticity of the propylene units of embodiments of the current invention is the use of mm triad tacticity. The mm triad tacticity of a polymer is the relative tacticity of a sequence of three adjacent propylene units, a chain consisting of head to tail bonds, expressed as a binary combination of m and r sequences. It is usually expressed for copolymers of the present invention as the ratio of the number of units of the specified tacticity to all of the propylene triads in the copolymer.

The triad tacticity (mm fraction) of a propylene copolymer can be determined from a $^{13}$C NMR spectrum of the propylene copolymer and the following formula:

$$mm \text{ Fraction} = \frac{PPP(mm)}{PPP(mm) + PPP(mr) + PPP(rr)}$$

where PPP(mm), PPP(mr) and PPP(rr) denote peak areas derived from the methyl groups of the second units in the following three propylene unit chains consisting of head-to-tail bonds:

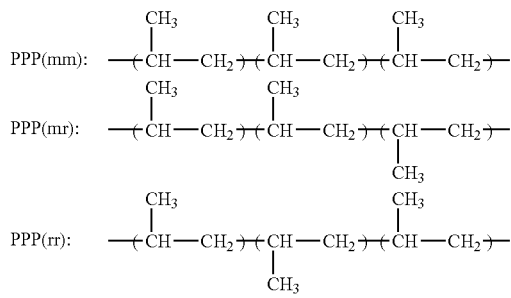

The $^{13}$C NMR spectrum of the propylene copolymer is measured as described in U.S. Pat. No. 5,504,172. The spectrum relating to the methyl carbon region (19-23 parts per million (ppm)) can be divided into a first region (21.2-21.9 ppm), a second region (20.3-21.0 ppm) and a third region (19.5-20.3 ppm). Each peak in the spectrum was assigned with reference to an article in the journal *Polymer*, Volume 30 (1989), page 1350. In the first region, the methyl group of the second unit in the three propylene unit chain represented by PPP (mm) resonates. In the second region, the methyl group of the second unit in the three propylene unit chain represented by PPP (mr) resonates, and the methyl group (PPE-methyl group) of a propylene unit whose adjacent units are a propylene unit and an ethylene unit resonates (in the vicinity of 20.7 ppm). In the third region, the methyl group of the second unit in the three propylene unit chain represented by PPP (rr) resonates, and the methyl group (EPE-methyl group) of a propylene unit whose adjacent units are ethylene units resonates (in the vicinity of 19.8 ppm).

The calculation of the mm triad tacticity is outlined in the techniques shown in U.S. Pat. No. 5,504,172. Subtraction of the peak areas for the error in propylene insertions (both 2,1 and 1,3) from peak areas from the total peak areas of the second region and the third region, the peak areas based on the 3 propylene units-chains (PPP(mr) and PPP(rr)) consisting of head-to-tail bonds can be obtained. Thus, the peak areas of PPP(mm), PPP(mr) and PPP(rr) can be evaluated, and hence the triad tacticity of the propylene unit chain consisting of head-to-tail bonds can be determined.

The SPC may have an mm triad tacticity of three propylene units, as measured by $^{13}$C NMR, of 75% or greater, 80% or greater, 82% or greater, 85% or greater, or 90% or greater.

A particularly preferred polymer useful as the SPC is a polymer with a low to moderate level of crystallinity derived from stereoregular propylene sequences (ie. propylene crystallinity). The crystallinity is disrupted in some manner such as by regio-inversions and the presence of comonomer.

In an alternate embodiment, any SPC described herein may have 0.05% or more 1,3 insertions, preferably 0.055 or more, preferably 0.060 or more as measured by the Carbon-13 NMR procedure described in U.S. Pat. No. 5,504,172.

In certain embodiments, the SPC of the present invention is present in the inventive blend compositions in an amount ranging from a lower limit of 1%, 5%, or 10% by weight based on the total weight of the composition, to an upper limit of 40%, 35%, or 30% by weight based on the total weight of the composition.

Examples of the second polymer component in this invention are those polymers described in detail as the "Second Polymer Component (SPC)" in WO 00/69963, WO 00/01766, WO 02/083753 and described in further detail as the "Propylene Olefin Copolymer" in WO 00/01745, all of which are fully incorporated by reference herein for purposes of US patent practice. As described in WO 00/01766, the second polymer component can be a propylene-ethylene copolymer comprising crystallizable propylene sequences that show a DSC melting temperature preferably between about 20° C. and 90° C. Table 1 of WO 00/01766 lists the DSC Tm (° C.) and heat of fusion (J/g) values for propylene-ethylene copolymers of varying ethylene content. A preferred SPC used in the present invention is described in detail as the "Second Polymer Component (SPC)" in co-pending U.S. applications U.S. Ser. No. 60/133,966, filed May 13, 1999, and U.S. Ser. No. 60/342,854, filed Jun. 29, 1999, and described in further detail as the "Propylene Olefin Copolymer" in U.S. Ser. No. 90/346,460, filed Jul. 1, 1999, which are fully incorporated by reference herein for purposes of U.S. practice. Suitable copolymers for use as SPC's are available commercially under the trade name Vistamaxx™ (ExxonMobil, Baytown Tex.). Suitable examples include: Vistamaxx™ 6100, Vistamaxx™6200 and Vistamax™ 3000.

Production of the Polymer Composition

According to the invention, the polymer composition is produced by a novel two-step process. In the first step of the process, propylene is polymerized in a first polymerization reaction zone at a temperature between about 50° C. and about 100° C., preferably about 60° C. to about 80° C. for a time, normally from about 0.25 hours to about 3 hours, sufficient to produce the FPC. The first polymerization step is conducted with propylene alone or with comonomers such that no more than 10 wt %, such as no more than 5%, preferably no more than 3%, of comonomers are incorporated in the FPC.

The first polymerization step can be conducted by any known polymerization method including high pressure, slurry, gas, bulk, or solution phase, or a combination thereof, using a traditional Ziegler-Natta catalyst or a single-site, metallocene catalyst system, or combinations thereof employing either homogeneous or supported catalyst systems. Polymerization may be carried out by a continuous or batch process and may include use of chain transfer agents, scavengers, or other such additives as deemed applicable. Preferably, the first polymerization step is conducted in the presence of a supported metallocene catalyst using a continuous slurry process to produce a crystalline, isotactic propylene polymer.

The product of the first polymerization step is then subjected to a second polymerization step in which propylene is copolymerized with at least one comonomer a second polymerization reaction zone in the presence of a metallocene catalyst at a temperature of at least 7° C. less than the temperature of the first polymerization step, such as between about 7° C. and about 50° C., for example between about 10° C. and about 40° C., less than the temperature of the first polymerization step. Conveniently, the second polymerization conditions comprising a second reaction temperature 4° C. or 6° C. less than said first reaction temperature. The second polymerization step is conducted for a time, normally from about 0.25 hours to about 3.0 hours, sufficient to produce the SPC as an in-reactor blend with the FPC.

The second polymerization step is conducted by a slurry polymerization process. Preferably, metallocene catalyst is added only at the first polymerization step and produces polymer in both the first and second polymerization reaction zones.

The second polymerization reaction zone can be the same as the first polymerization reaction zone, or alternatively the first and second polymerization reaction zones can be in separate portions of the same reactor or in separate reactors.

Hydrogen may be added to one or both of the first and second polymerization reaction zones to control molecular weight, intrinsic viscosity and melt flow rate. The use of hydrogen for such purposes is well known to those skilled in the art.

The metallocene catalysts useful in the process of the invention are not narrowly defined but generally it is found that the most suitable are those in the generic class of bridged, substituted bis(cyclopentadienyl) metallocenes, specifically bridged, substituted bis(indenyl) metallocenes known to produce high molecular weight, high melting, highly isotactic propylene polymers. Generally speaking, those of the generic class disclosed in U.S. Pat. No. 5,770,753 (fully incorporated herein by reference) should be suitable, however, it has been found that the exact polymer obtained is highly dependent on the metallocene's specific substitution pattern.

Particularly preferred are racemic metallocenes, such as rac-dimethylsiladiyl(2-isopropyl,4-phenylindenyl)$_2$ zirconium dichloride; rac-dimethylsiladiyl(2-isopropyl,4-[1-naphthyl]indenyl)$_2$ zirconium dichloride; rac-dimethylsiladiyl(2-isopropyl,4-[3,5-dimethylphenyl]indenyl)$_2$ zirconium dichloride; rac-dimethylsiladiyl(2-isopropyl,4-[ortho-methyl-phenyl]indenyl)$_2$ zirconium dichloride; rac dimethylsiladlyl bis-(2-methyl, 4-napthyl indenyl) zirconium dichloride, rac-dimethyl siladiyl(2-isopropyl, 4-[3,5 di-t-butyl-phenyl]indenyl)$_2$ zirconium dichloride; rac-dimethyl siladiyl(2-isopropyl, 4-[orthophenyl-phenyl]indenyl)$_2$ zirconium dichloride, rac-diphenylsiladiyl(2-methyl-4-[1-naphthyl]indenyl)$_2$ zirconium dichloride and rac-biphenyl siladiyl (2-isopropyl, 4-[3,5 di-t-butyl-phenyl]indenyl)$_2$ zirconium dichloride. Alkylated variants of these metallocenes (e.g. dimethyl instead of dichloride) are also contemplated, dictated by the choice of catalyst activation system. These and other metallocene compositions are described in detail in U.S. Pat. Nos. 6,376,407, 6,376,408, 6,376,409, 6,376,410, 6,376,411, 6,376,412, 6,376,413, 6,376,627, 6,380,120, 6,380,121, 6,380,122, 6,380,123, 6,380,124, 6,380,330, 6,380,331, 6,380,334, 6,399,723 and 6,825,372 (all fully incorporated herein by reference). In a preferred embodiment the metallocene catalyst comprises one or more of the compounds listed in WO/2004/026921, page 29, paragraph [00100] to page 66, line 4.

Metallocenes are generally used in combination with some form of activator in order to create an active catalyst system. The term "activator" is defined herein to be any compound or component, or combination of compounds or components, capable of enhancing the ability of one or more metallocenes to polymerize olefins. Alkylalumoxanes such as methylalumoxane (MAO) are commonly used as metallocene activators. Generally alkylalumoxanes contain 5 to 40 of the repeating units:

R(AlRO)$_x$AlR$_2$ for linear species and

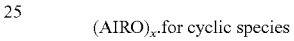

(AlRO)$_x$ for cyclic species where R is a C$_1$ to C$_8$ alkyl including mixed alkyls.

Compounds in which R is methyl are particularly preferred. Alumoxane solutions, particularly methylalumoxane solutions, may be obtained from commercial vendors as solutions having various concentrations. There are a variety of methods for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,103,031 and EP-A-0 561 476, EP-B1-0 279 586, EP-A-0 594-218 and WO 94/10180, each fully incorporated herein by reference. It may be preferable to use a visually clear methylalumoxane. A cloudy or gelled alumoxane can be filtered to produce a clear solution or clear alumoxane can be decanted from the cloudy solution. Another useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584). When the activator is an alumoxane (modified or unmodified), some embodiments select the maximum amount of activator at a 5000-fold molar excess Al/M over the catalyst precursor (per metal catalytic site). The minimum activator-to-catalyst-precursor is a 1:1 molar ratio.

Ionizing activators may also be used to activate metallocenes. These activators are neutral or ionic, or are compounds such as tri(n-butyl)ammonium tetrakis(pentafluorophenyl)borate, which ionize the neutral metallocene compound. Such ionizing compounds may contain an active proton, or some other cation associated with, but not coordinated or only loosely coordinated to, the remaining ion of the ionizing compound. Combinations of activators may also be used, for example, alumoxane and ionizing activator combination, see for example, WO 94/07928.

Descriptions of ionic catalysts for coordination polymerization comprised of metallocene cations activated by non-coordinating anions appear in the early work in EP-A-0 277 003, EP-A-0 277 004 and U.S. Pat. No. 5,198,401 and WO-A-92/00333 (incorporated herein by reference). These teach desirable methods of preparation wherein metallocenes (bisCp and monoCp) are protonated by an anion precursor such that an alkyl/hydride group is abstracted from a transition metal to make it both cationic and charge-balanced by the non-coordinating anion. Suitable ionic salts include tetrakis-substituted borate or aluminum salts having fluorided aryl-constituents such as phenyl, biphenyl and napthyl.

The term "noncoordinating anion" (NCA) means an anion which either does not coordinate to said cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Particularly useful noncoordinating anions are those which are compatible and stabilize the metallocene cation in the sense of balancing its ionic charge in a +1 state, yet retain sufficient lability to permit displacement by an ethylenically or acetylenically unsaturated monomer during polymerization.

The use of ionizing ionic compounds not containing an active proton but capable of producing both the active metallocene cation and a noncoordinating anion is also known. See, for example, EP-A-0 426 637 and EP-A-0 573 403 (incorporated herein by reference). An additional method of making the ionic catalysts uses ionizing anion precursors which are initially neutral Lewis acids but form the cation and anion upon ionizing reaction with the metallocene compounds, for example the use of tris(pentafluorophenyl)borane. See EP-A-0 520 732 (incorporated herein by reference). Ionic catalysts for addition polymerization can also be prepared by oxidation of the metal centers of transition metal compounds by anion precursors containing metallic oxidizing groups along with the anion groups, see EP-A-0 495 375 (incorporated herein by reference).

Where the metal ligands of the metallocenes include halogen moieties (for example, bis-cyclopentadienyl zirconium dichloride) they can be converted via known alkylation reactions with organometallic compounds such as lithium or aluminum hydrides or alkyls, alkylalumoxanes, Grignard reagents, etc. See EP-A-0 500 944 and EP-A1-0 570 982 (incorporated herein by reference) for in situ processes describing the reaction of alkyl aluminum compounds with dihalo-substituted metallocene compounds prior to or with the addition of activating anionic compounds.

Preferred activators for use herein include those listed in WO/2004/026921, at page 77 paragraph [00135] to page 78, and WO 2004/046214, at paragraph [00177] to paragraph [00178].

In general the catalyst compound(s) and the activator are combined in ratios of about 1000:1 to about 0.5:1. In a preferred embodiment the catalyst compounds and the activator are combined in a ratio of about 300:1 to about 1:1, preferably about 150:1 to about 1:1, for boranes, borates, aluminates, etc. preferably the ratio is about 1:1 to about 10:1.

Methods for supporting ionic catalysts comprising metallocene cations and NCA are described in U.S. Pat. No. 5,643,847 (incorporated herein by reference). When the activator for the metallocene supported catalyst composition is a NCA, preferably the NCA is first added to the support composition followed by the addition of the metallocene catalyst. When the activator is MAO, preferably the MAO and metallocene catalyst are dissolved together in solution. The support is then contacted with the MAO/metallocene catalyst solution. Other methods and order of addition will be apparent to those skilled in the art.

The catalyst systems used in the process of this invention are preferably supported using a porous particulate material, such as for example, talc, inorganic oxides, inorganic chlorides and resinous materials such as polyolefin or polymeric compounds. Preferably, the support materials are porous inorganic oxide materials, which include those from the Periodic Table of Elements of Groups 2, 3, 4, 5, 13 or 14 metal oxides. Silica, alumina, silica-alumina, and mixtures thereof are particularly preferable. Other inorganic oxides that may be employed either alone or in combination with the silica, alumina or silica-alumina are magnesia, titania, zirconia, and the like.

Preferably the support material is porous silica which has a surface area in the range of from 10 to 700 $m^2/g$, a total pore volume in the range of from 0.1 to 4.0 cc/g and an average particle size in the range of from 10 to 500 µm. More preferably, the surface area is in the range of from 50 to 500 $m^2/g$, the pore volume is in the range of from 0.5 to 3.5 cc/g and the average particle size is in the range of from 20 to 200 µm. Most desirably the surface area is in the range of from 100 to 400 $m^2/g$, the pore volume is in the range of from 0.8 to 3.0 cc/g and the average particle size is in the range of from 30 to 100 µm. The average pore size of typical porous support materials is in the range of from 10 to 1000 Angstrom. Preferably, a support material is used that has an average pore diameter of from 50 to 500 Angstrom, and most desirably from 75 to 350 Angstrom. It may be particularly desirable to dehydrate the silica at a temperature of from 100° C. to 800° C. anywhere from 3 to 24 hours.

Additives

The polymer blend produced according to the invention may optionally contain reinforcing and non-reinforcing fillers, plasticizers, antioxidants, stabilizers, neutralizers, processing oils, extender oils, lubricants, slip agents, anti-blocking agents, antistatic agents, waxes, foaming agents, pigments, flame retardants, hydrocarbon resins, light (e.g. UV) stabilizers, nucleating agents, clarifying agents and other processing aids known in the art. Such additives may comprise up to about 70 weight % of the total composition. Fillers and extenders which can be utilized include conventional inorganics such as calcium carbonate, clays, silica, talc, titanium dioxide, carbon black and the like. The processing oils generally are paraffinic, naphthenic or aromatic oils derived from petroleum fractions.

The polymer blend produced according to the invention may also be blended with other polymers, particularly other polyolefins, such as with other propylene polymers.

In a particularly preferred embodiment, the polymer blend produced according to the invention may also be blended with a "non-functionalized plasticizer (NFP)" as described in WO 2004/014998. Preferably the polymer blend produced according to the invention is blended with the NFP's described at pages page 16, line 14 to page 24, line 1. In a particularly preferred embodiment the polymer blend produced according to the invention may also be blended with polyalpha-olefins having a Viscosity index of 120 or more, preferably 130 or more (as measured by ASTM 2270). In a particularly preferred embodiment the polymer blend produced according to the invention may also be blended with polyalpha-olefins having a flash point of 200° C. or more, preferably 210° C. or more, preferably 230° C. or more (as measured by ASTM 56), and a Kinematic viscosity at 100° C. of 35 cSt or more, preferably 40 cSt or more, preferably 45 cSt or more (as measured by ASTM 445), and or a pour point of less than −20° C., preferably less than −25° C., preferably less than −30 degc ° C. (as measured by ASTM D97).

Applications

The polymer blends made in accordance with the invention have many useful applications. For example, fabricated articles made from the polymers may be prepared using all of the conventional polyolefin processing techniques. Useful articles include films (e.g., cast, blown, calendaring and extrusion coated), including multi-layer films, greenhouse films, shrink films including clarity shrink film, lamination film, biaxially-oriented film, extrusion coating, liners, clarity liners, overwrap film, agricultural film; fibers (e.g., staple fibers) including use of an interpolymer disclosed herein as at least one component comprising at least a portion of the fiber), spunbond fibers or melt blown fibers (using, e.g., systems as disclosed in U.S. Pat. Nos. 4,430,563, 4,663,220, 4,668,566 or 4,322,027), and gel spun fibers (e.g., the system disclosed in U.S. Pat. No. 4,413,110); both woven and nonwoven fabrics (e.g., spunlaced fabrics disclosed in U.S. Pat. No. 3,485,706, spunbond fabrics and melt blown nonwoven fabrics) or structures made from such fibers (including, e.g., blends of these fibers with other fibers such as PET or cotton), foams, and thermoform and molded articles (e.g., made using an injection molding process, a blow molding process or a rotomolding process). Monolayer and multilayer films may be made according to the film structures and fabrication methods described in U.S. Pat. No. 5,685,128.

In another embodiment, the invention relates to:

1A. A process for producing a polymer blend comprising (a) a first polymer component comprising a crystalline propylene polymer and (b) a second polymer component comprising a copolymer of propylene with at least one comonomer, wherein the copolymer comprises between about 7 wt % and about 28 wt % of said at least one comonomer and the copolymer has a heat of fusion of from 0.5 J/g to 70 J/g and an mm triad tacticity of 75% or greater, the process comprising:
(i) polymerizing propylene under first polymerization conditions in a polymerization reaction zone to produce a first effluent comprising a crystalline propylene polymer containing no more than 10% by weight of other monomers, the first polymerization conditions comprising a first reaction temperature between about 50° C. and about 100° C.; and
(ii) subsequently copolymerizing propylene with said at least one comonomer under second polymerization conditions in the presence of a metallocene catalyst and at least part of said first effluent in a slurry polymerization reaction zone to produce said second polymer component, the second polymerization conditions comprising a second reaction temperature at least 7° C. less than said first reaction temperature.

2A. The process of paragraph 1A wherein the polymerizing (i) is conducted in the presence of a metallocene catalyst.

3A. The process of paragraph 2A wherein the metallocene catalyst used in (i) and (ii) is selected from rac-dimethylsiladiyl(2-isopropyl,4-phenylindenyl)$_2$ zirconium dichloride; rac-dimethylsiladiyl(2-isopropyl,4-[1-naphthyl]indenyl)$_2$ zirconium dichloride; rac-dimethylsiladiyl(2-isopropyl,4-[3,5-dimethylphenyl]indenyl)$_2$ zirconium dichloride; rac-dimethylsiladiyl(2-isopropyl,4-[ortho-methyl-phenyl]indenyl)$_2$ zirconium dichloride; rac dimethylsiladlyl bis-(2-methyl, 4-napthyl indenyl) zirconium dichloride, rac-dimethyl siladiyl(2-isopropyl, 4-[3,5 di-t-butyl-phenyl]indenyl)$_2$ zirconium dichloride; rac-dimethyl siladiyl(2-isopropyl, 4-[orthophenyl-phenyl]indenyl)$_2$ zirconium dichloride, rac-diphenylsiladiyl(2-methyl-4-[1-naphthyl]indenyl)$_2$ zirconium dichloride, rac-biphenyl siladiyl(2-isopropyl, 4-[3,5 di-t-butyl-phenyl]indenyl)$_2$ zirconium dichloride and variants thereof wherein the dichloride is replaced by dialkyl.

4A. The process of paragraph 2A or 3A wherein the same metallocene catalyst is used for polymerizing (i) and (ii) and is added only to polymerization reaction zone (i)

5A. The process of paragraph 1A, 2A, 3A or 4A wherein the copolymerizing (i) is conducted by a slurry process.

6A. The process of any of paragraphs 1A to 5A wherein the polymerizing (i) is conducted such that said first effluent comprises a crystalline propylene polymer containing no more than 5% by weight of other monomers.

7A. The process of paragraph 6A wherein the polymerizing (i) is conducted such that said first effluent comprises a crystalline propylene polymer containing no more than 3% by weight of other monomers.

8A. The process of paragraph 6A wherein the polymerizing (i) is conducted in the substantial absence of monomers other than propylene.

9A. The process of any of paragraphs 1A to 8A wherein said at least one comonomer in (ii) is ethylene or a $C_4$ to $C_{12}$ α-olefin.

10A. The process of any of paragraphs 1A to 8A wherein said at least one comonomer in (ii) is selected from ethylene, 1-butene, 1-pentene, 1-hexene, and 1-octene.

11A. The process of any of paragraphs 1A to 8A wherein the second polymer comprises from about 8% to about 28% by weight of at least one comonomer.

12A. The process of paragraph 10A wherein said at least one comonomer in (ii) is ethylene.

13A. The process of any of paragraphs 1A to 12A wherein said second polymerization conditions comprise a second temperature between about 7° C. and about 50° C. less than said first temperature.

14A. The process of paragraph 13A wherein said second polymerization conditions comprise a second temperature between about 10° C. and about 40° C. less than said first temperature.

15A. The process of any of paragraphs 1A to 14A wherein the copolymerizing (ii) is conducted in the same polymerization reaction zone as the polymerizing (i).

16A. The process of any of paragraphs 1A to 15A wherein the second polymer component has a heat of fusion of about 3 J/g to about 50 J/g.

17A. The process of any of paragraphs 1A to 16A wherein the second polymer component has an mm triad tacticity of 80% or greater.

18A. The process of any of paragraphs 1A to 17A wherein the second polymer component has an intermolecular compositional distribution as determined by thermal fractionation in hexane such that 85% by weight or more of the second polymer component is isolated as one or two adjacent, soluble fractions with the balance of the second polymer component being isolated in immediately preceding or succeeding fractions; and wherein each of said fractions has a wt % comonomer content with a difference of no greater than 20 wt % relative to the average wt % comonomer content of the second polymer component.

19A. The process of any of paragraphs 1A to 18A wherein each of said fractions has a wt % comonomer content with a difference of no greater than 10 wt % relative to the average wt % comonomer content of the second polymer component.

20A. The process of any of paragraphs 1A to 19A wherein the second polymer component has an intermolecular compositional distribution as determined by thermal fractionation in hexane such that 90% by weight or more of the second polymer component is isolated as one or two adjacent, soluble fractions with the balance of the second polymer component being isolated in immediately preceding or succeeding fractions; and wherein each of said fractions has a wt % comonomer content with a difference of no greater than 20 wt % relative to the average wt % comonomer content of the second polymer component.

21A. The process of paragraph 20A wherein each of said fractions has a wt % comonomer content with a difference of no greater than 10 wt % relative to the average wt % comonomer content of the second polymer component.

22A. The process of any of paragraphs 1A to 21A wherein the second polymer component further has a melting point of 89° C. or less, preferably 85° C. or less, preferably 80° C. or less, preferably 78° C. or less, preferably 75° C. or less.

23A. The process of any of paragraphs 1A to 22A wherein the second polymer component further has 0.05% or more 1,3 insertions as measured Carbon 13 NMR, preferably 0.055% or more, preferably 0.060% or more.

24A. The process of any of paragraphs 1A to 23A wherein the second polymer component has 15 mole % or less comonomer (preferably ethylene) and has a melting point of 78° C. or less, preferably 75° C. or less.

25A. The process of any of paragraphs 1A to 23A wherein the second polymer component has more than 15 mole % comonomer (preferably ethylene) and has a melting point of 89° C. or less, preferably 85° C. or less.

The invention will now be more particularly described with reference to the Examples.

Melt Flow Rate (MFR) was measured according to ASTM D-1238; 2.16 kg, 230° C.

Molecular weight (weight-average molecular weight, Mw, and number-average molecular weight, Mn) were determined using a High Temperature Size Exclusion Chromatograph (either from Waters Corporation or Polymer Laboratories), equipped with a differential refractive index detector (DRI), an online light scattering detector, and a viscometer. Experimental details not described below, including how the detectors were calibrated, are described in: T. Sun, P. Brant, R. R. Chance, and W. W. Graessley, Macromolecules, Volume 34, Number 19, 6812-6820, (2001).

Three Polymer Laboratories PLgel 10 mm Mixed-B columns were used. The nominal flow rate was 0.5 cm$^3$/min, and the nominal injection volume was 300 μL. The various transfer lines, columns and differential refractometer (the DRI detector) were contained in an oven maintained at 135° C.

Solvent for the SEC experiment was prepared by dissolving 6 grams of butylated hydroxy toluene as an antioxidant in 4 liters of Aldrich reagent grade 1,2,4 trichlorobenzene (TCB). The TCB mixture was then filtered through a 0.7 μm glass pre-filter and subsequently through a 0.1 μm Teflon filter. The TCB was then degassed with an online degasser before entering the SEC.

Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units are 1.463 g/ml at room temperature and 1.324 g/ml at 135° C. The injection concentration ranged from 1.0 to 2.0 mg/ml, with lower concentrations being used for higher molecular weight samples.

Prior to running each sample the DRI detector and the injector were purged. Flow rate in the apparatus was then increased to 0.5 ml/minute, and the DRI was allowed to stabilize for 8-9 hours before injecting the first sample. The LS laser was turned on 1 to 1.5 hours before running samples.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the same as described below for the LS analysis. Units on parameters throughout this description of the SEC method are such that concentration is expressed in g/cm$^3$, molecular weight is expressed in g/mole, and intrinsic viscosity is expressed in dL/g.

The light scattering detector used was a Wyatt Technology High Temperature mini-DAWN. The polymer molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_c c$$

Here, $\Delta R(\theta)$ is the measured excess Rayleigh scattering intensity at scattering angle θ, c is the polymer concentration determined from the DRI analysis, $A_2$ is the second virial coefficient, $P(\theta)$ is the form factor for a monodisperse random coil (described in the above reference), and $K_o$ is the optical constant for the system:

$$K_o = \frac{4\pi^2 n^2 (dn/dc)^2}{\lambda^4 N_A}$$

in which $N_A$ is Avogadro's number, and (dn/dc) is the refractive index increment for the system. The refractive index, n=1.500 for TCB at 135° C. and λ=690 nm. In addition, $A_2$=0.0006 for propylene polymers and 0.0015 for butene polymers, and (dn/dc)=0.104 for propylene polymers and 0.098 for butene polymers.

A high temperature Viscotek Corporation viscometer was used, which has four capillaries arranged in a Wheatstone bridge configuration with two pressure transducers. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3 (c[\eta])^2$$

where c was determined from the DRI output.

Melting point (Tm) was measured using a TA Instruments model 2910 machine. Samples weighing approximately 5-10 mg were sealed in aluminum sample pans. The DSC data was recorded by first cooling the sample to about −50° C. and then gradually heating it to 200° C. at a rate of 10° C./min. The sample was kept at 200° C. for 5 min before a second cooling/heating cycle was applied. Both the first and second cycle thermal events were recorded. For first polymer component, the melting temperature was measured and reported during the second heating cycle (or second melt). For second polymer component, the melting temperature was measured and reported during the first heating cycle. Prior to the DSC measurement, the sample was aged (by holding it at ambient temperature for a period of least 48 hr.

Ethylene content was measured as follows. A thin homogeneous film was pressed at a temperature of about 150° C. or greater, then mounted on a Perkin Elmer PE 1760 infrared spectrophotometer. A full spectrum of the sample from 600 $cm^{-1}$ to 4000 $cm^{-1}$ was recorded and the monomer weight percent of ethylene was calculated according to the following equation: Ethylene wt %=82.585−111.987X+30.045 $X^2$, wherein X is the ratio of the peak height at 1155 $cm^{-1}$ and peak height at either 722 $cm^{-1}$ or 732 $cm^{-1}$, whichever is higher.

EXAMPLE 1

Production of Supported Catalyst

In a dry box, 0.044 g of rac di-methyl silyl bis-(2-methyl, 4-napthyl indenyl) zirconium dichloride, obtained from Boulder Scientific (Boulder, Colo.), was added to 6.74 g of 30% methylalumoxane in toluene (7.2 ml) in a 100 ml round bottomed flask. The contents were stirred for 20 minutes and the color of the liquid changed from amber to cherry-red, with a slight haze. The contents of the flask were filtered on a medium frit filter, with toluene being added to wash the frit. The filtrate was a clear cherry-red solution. 4.0 g of Davison 948 silica (after dehydration at 600° C.) was added to the filtrate and slurried for 20 min. The slurry was roto-vacuumed at 40° C. for 2.5 hr. 5.34 g of supported catalyst was left behind (pink solid). The catalyst was added to oil and stored (18 wt % in oil slurry).

EXAMPLE 2

Polymerization of Propylene Homopolymer

The polymerization was conducted in a clean, dry 2 liter autoclave. Relevant reactor conditions are shown in Table 1. After the reactor had been flushed with propylene vapor, triethyl aluminum (TEAL) scavenger (0.3 ml, 1.5 M) was added. The indicated amount of hydrogen gas (see Table 1) was also added at this point. The reactor was then closed and filled with about 800 ml of liquid propylene. After heating the reactor to about 70° C., the supported catalyst from Example 1 was added by washing it in with 200 ml of liquid propylene. After the indicated time (see Table 1), the reactor was cooled down to about 40° C. and the excess propylene vented. The polymer, consisting of free-flowing granules, was removed and dried. The homopolymer product had an MFR of 1.89 dg/min, GPC Mw of 348,000, Mw/Mn of 2.3; and a DSC peak melting temperature of 150.8° C.

EXAMPLE 3

Polymerization of Propylene Ethylene Elastomer

The polymerization was conducted in a clean, dry 2 liter autoclave. Relevant reactor conditions are again shown in Table 1. After the reactor had been flushed with propylene vapor, triethyl aluminum (TEAL) scavenger (0.3 ml, 1.5 M) was added. No hydrogen was fed to the reactor. The reactor was closed and filled with about 800 ml of liquid propylene. Ethylene gas was fed to the reactor to maintain a 200 psi (1380 kPa) over-pressure of ethylene. The reactor was maintained at 40° C. The supported catalyst was added by washing it in with 200 ml of liquid propylene. After 12 min of operation the agitator speed had decreased considerably, from 400 rpm to 70 rpm due to the growth of clumps of polymer on the stirrer. The stirrer was turned off and the reaction stopped. The polymer clumps were removed and dried. The propylene/ethylene copolymer elastomer product had an ethylene content of 14.8 wt %, a GPC Mw of 559,000, and Mw/Mn of 2.35. The polymer showed a faint melting endotherm at 70° C.

EXAMPLE 4

Polymerization of Polypropylene/Propylene Ethylene Elastomer Blend

The polymerization was conducted in a clean, dry 2 liter autoclave. Relevant reactor conditions are shown in Table 1. After the reactor had been flushed with propylene vapor, triethyl aluminum (TEAL) scavenger (0.3 ml, 1.5 M) was added. Hydrogen gas was also added at this point. The reactor was then closed and filled with about 800 ml of liquid propylene. After heating the reactor to about 70° C., the supported catalyst was added by washing it in with 200 ml of liquid propylene. After the indicated time (see Table 1), the reactor was cooled down to 44° C. and vented for a few seconds during the cool down (from about 430 psig [3066 kPa] to about 225 psig [1652 kPa]). This vented off the hydrogen. No fresh hydrogen was added. Ethylene gas was passed into the reactor to maintain a 200 psi (1379 kPa) over-pressure of ethylene. Polymerization continued at 44° C. for an additional 10 min. The reaction was stopped and the reactor cooled and vented. The polymer, consisting of free-flowing granules, was removed and dried. The polymer, a reactor blend of homopolymer and propylene-ethylene elastomer, had an MFR of 2.0 dg/min, a GPC Mw of 319,000, Mw/Mn of 2.7; and a DSC melting temperature of 150° C. The ethylene comonomer content of the elastomer component was estimated to be about 14 wt %.

TABLE 1

Reactor Conditions for Polymerization Experiments

| | Example | | | |
|---|---|---|---|---|
| | | | 4 | |
| | 2 | 3 | Stage 1 | Stage 2 |
| Reactor Temp. (° C.) | 70 | 40 | 70 | 44 |
| $H_2$ amount (mmole) | 54 | 0 | 54 | 0 |
| Catalyst amount (mg) | 50 | 52 | 53 | None |
| Reaction time (min) | 60 | 12 (stopped) | 60 | 10 |
| $C_2$ over-pressure (kPa) | 0 | 1379 | 0 | 1379 |
| Polymer yield (g) | 124.2 | 42.5 | 182.3 | |
| Catalyst Efficiency (kg/g) | 2.48 | 0.81 | 3.44 | |

While there have been described what are presently believed to be the preferred embodiments of the present invention, those skilled in the art will realize that other and further embodiments can be made without departing from the spirit of the invention, and is intended to include all such further modifications and changes as come within the true scope of the claims set forth herein. Likewise, the term "comprising" is considered synonymous with the term "including" for purposes of Australian law. All documents described herein are incorporated by reference herein, including any priority documents and/or testing procedures, except to the extent they are inconsistent with this specification, provided however that U.S. Ser. No. 10/930,447, U.S. Ser. No. 10/303,448, U.S. Ser. No. 08/916,699, and U.S. Ser. No. 60/025,398 are NOT incorporated by reference herein.

What is claimed is:

1. A process for producing a reactor blend polymer comprising (a) a first polymer component comprising a crystalline propylene polymer having no more than 10% by weight of other monomers and (b) a second polymer component comprising a copolymer of propylene with at least one comonomer, wherein the copolymer comprises between about 7 wt % and about 25 wt % of said at least one comonomer and the copolymer has a heat of fusion of from 0.5 J/g to 70 J/g, a melting point by DSC ranging from 110° C. to 45° C., and an mm triad tacticity of 75% or greater, the process comprising:

(i) polymerizing propylene under first polymerization conditions in the presence of a metallocene catalyst in a polymerization reaction zone to produce a first effluent comprising said first polymer component, wherein the first polymerization conditions comprising a first reaction temperature between about 50° C. and about 100° C.; and (ii) subsequently copolymerizing propylene with said at least one comonomer under second polymerization conditions in the presence of said metallocene catalyst and at least part of said first effluent in a second slurry polymerization reaction zone to produce said second polymer component substantially without fouling of said slurry polymerization reaction zone, wherein the second polymerization conditions comprising a slurry process having a second reaction temperature 4° C. or 6° C. less than said first reaction temperature.

2. The process of claim 1 wherein the metallocene catalyst used in polymerizing step (i) and copolymerizing step (ii) is selected from the group consisting of rac-dimethylsiladiyl(2-isopropyl,4-phenylindenyl)$_2$ zirconium dichloride; rac-dimethylsiladiyl(2-isopropyl,4-[1-naphthyl]indenyl)$_2$ zirconium dichloride; rac-dimethylsiladiyl(2-isopropyl,4-[3,5-dimethylphenyl]indenyl)$_2$ zirconium dichloride; rac-dimethylsiladiyl(2-isopropyl,4-[ortho-methyl-phenyl]indenyl)$_2$ zirconium dichloride; rac dimethylsiladlyl bis-(2-methyl, 4-napthyl indenyl)zirconium dichloride, rac-dimethyl siladiyl(2-isopropyl, 4-[3,5 di-t-butyl-phenyl]indenyl)$_2$ zirconium dichloride; rac-dimethyl siladiyl(2-isopropyl, 4-[orthophenyl-phenyl]indenyl)$_2$ zirconium dichloride, rac-diphenylsiladiyl(2-methyl-4-[1-naphthyl]indenyl)$_2$ zirconium dichloride, rac-biphenyl siladiyl(2-isopropyl, 4-[3,5 di-t-butyl-phenyl]indenyl)$_2$ zirconium dichloride and variants thereof, wherein the dichloride is replaced by dialkyl.

3. The process of claim 2 wherein said metallocene catalyst used for polymerizing step (i) and copolymerizing step (ii) is added only to said polymerization reaction zone.

4. The process of claim 1 wherein the first polymerization conditions of the polymerizing step (i) comprises a slurry process.

5. The process of claim 1 wherein the polymerizing step (i) is conducted such that said first effluent comprises a crystalline propylene polymer containing no more than 5% by weight of other monomers.

6. The process of claim 1 wherein the polymerizing step (i) is conducted such that said first effluent comprises a crystalline propylene polymer containing no more than 3% by weight of other monomers.

7. The process of claim 1 wherein the polymerizing step (i) is conducted in the substantial absence of monomers other than propylene.

8. The process of claim 1 wherein said at least one comonomer in the copolymerizing step (ii) is ethylene or a $C_4$ to $C_{12}$ α-olefin.

9. The process of claim 1 wherein said at least one comonomer in the copolymerizing step (ii) is selected from ethylene, 1-butene, 1-pentene, 1-hexene, and 1-octene.

10. The process of claim 1 wherein the second polymer component comprises from about 10% to about 20% by weight of at least one comonomer.

11. The process of claim 9 wherein said at least one comonomer in copolymerizing step (ii) is ethylene.

12. The process of claim 1 wherein the copolymerizing step (ii) is conducted in the same polymerization reaction zone as the polymerizing step (i).

13. The process of claim 1 wherein the second polymer component has a heat of fusion of about 3 J/g to about 50 J/g.

14. The process of claim 1 wherein the second polymer component has a mm triad tacticity of 80% or greater.

15. The process of claim 1 wherein the second polymer component has an intermolecular compositional distribution as determined by thermal fractionation in hexane such that 85% by weight or more of the second polymer component is isolated as one or two adjacent, soluble fractions with the balance of the second polymer component being isolated in immediately preceding or succeeding fractions; and wherein each of said fractions has a wt % comonomer content with a difference of no greater than 20 wt % relative to the average wt % comonomer content of the second polymer component.

16. The process of claim 15 wherein each of said fractions has a wt % comonomer content with a difference of no greater than 10 wt % relative to the average wt % comonomer content of the second polymer component.

17. The process of claim 1 wherein the second polymer component has an intermolecular compositional distribution as determined by thermal fractionation in hexane such that 90% by weight or more of the second polymer component is isolated as one or two adjacent, soluble fractions with the balance of the second polymer component being isolated in immediately preceding or succeeding fractions; and wherein each of said fractions has a wt % comonomer content with a difference of no greater than 20 wt % relative to the average wt % comonomer content of the second polymer component.

18. The process of claim 17 wherein each of said fractions has a wt % comonomer content with a difference of no greater than 10 wt % relative to the average wt % comonomer content of the second polymer component.

19. The process of claim 1 wherein the second polymer component has a melting point of 78° C. or less and the comonomer is ethylene and is present at 15 mole % or less.

20. The process of claim 1 wherein the second polymer component has a melting point of 85° C. or less and the comonomer is ethylene and is present at more than 15 mole %.

21. The process of claim 1 wherein the second polymer component has 0.05% or more 1,3 insertions as measured Carbon 13 NMR.

* * * * *